United States Patent
Pollema et al.

(10) Patent No.: US 8,552,836 B2
(45) Date of Patent: Oct. 8, 2013

(54) SYSTEM AND METHOD FOR COUPLING A COMPONENT TO A VEHICLE

(75) Inventors: Joshua R. Pollema, Saint Peters, MO (US); James V. Leonard, Saint Charles, MO (US); Richard E. Meyer, Florissant, MO (US); John D. Musgraves, Jr., Festus, MO (US); William J. Ebert, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 811 days.

(21) Appl. No.: 12/254,417

(22) Filed: Oct. 20, 2008

(65) Prior Publication Data

US 2010/0097183 A1 Apr. 22, 2010

(51) Int. Cl.
*H04Q 5/22* (2006.01)
*G08B 21/00* (2006.01)
*G05B 19/18* (2006.01)
*G01C 9/00* (2006.01)
*G05D 1/02* (2006.01)

(52) U.S. Cl.
USPC .......... 340/10.1; 340/686.2; 340/686.4; 700/56; 700/57; 700/58; 700/59; 700/65; 700/66; 702/150; 701/300; 701/302; 398/123; 398/129; 398/131; 398/156; 244/137.4

(58) Field of Classification Search
USPC ........ 340/10.1, 686.2–686.6; 700/56–70; 702/150–154; 701/300–302; 398/123, 398/129, 131, 156; 244/137.4
See application file for complete search history.

(56) References Cited

U.S. PATENT DOCUMENTS

| | | | |
|---|---|---|---|
| 3,911,786 A | 10/1975 | Scheetz et al. | |
| 3,917,196 A * | 11/1975 | Pond et al. | 342/23 |
| 4,158,885 A * | 6/1979 | Neuberger | 701/300 |
| 4,246,472 A | 1/1981 | Sun et al. | |
| 5,530,650 A * | 6/1996 | Biferno et al. | 701/300 |
| 5,904,729 A * | 5/1999 | Ruzicka | 701/300 |
| 6,122,569 A | 9/2000 | Ebert et al. | |
| 6,371,424 B1 | 4/2002 | Shaw | |
| 6,668,950 B2 | 12/2003 | Park | |
| 6,705,571 B2 | 3/2004 | Shay et al. | |
| 6,932,299 B2 * | 8/2005 | Beyerle et al. | 244/137.4 |
| 7,093,314 B2 * | 8/2006 | Hutton et al. | 14/71.5 |
| 7,142,120 B2 * | 11/2006 | Charych et al. | 340/572.4 |
| 7,793,888 B2 * | 9/2010 | Padan | 244/137.4 |
| 2004/0062630 A1 | 4/2004 | Marrero | |
| 2004/0237224 A1 * | 12/2004 | Hutton | 14/71.5 |
| 2005/0145752 A1 * | 7/2005 | Beyerle et al. | 244/137.4 |
| 2006/0202088 A1 * | 9/2006 | Padan | 244/137.1 |
| 2007/0114280 A1 * | 5/2007 | Coop et al. | 235/385 |
| 2007/0210952 A1 * | 9/2007 | Hutton | 342/23 |
| 2008/0098538 A1 * | 5/2008 | Hutton | 14/71.5 |
| 2008/0109970 A1 * | 5/2008 | Hutton | 14/71.5 |
| 2008/0229525 A1 * | 9/2008 | Hutton | 14/71.5 |

* cited by examiner

*Primary Examiner* — Daniel Wu
*Assistant Examiner* — Kam Ma
(74) *Attorney, Agent, or Firm* — Armstrong Teasdale LLP

(57) ABSTRACT

An alignment system for coupling a component to a vehicle includes at least one sensor target coupled to the component, and a controller assembly configured to transmit a signal towards the sensor target and receive a reflected signal from the sensor target, wherein the controller assembly is configured to output an orientation dataset for the component relative to the vehicle using the reflected signal. The system also includes a processing device communicatively coupled to the controller assembly, wherein the processing device is programmed to translate the orientation dataset and cause a set of component positioning signals based on the orientation dataset to be displayed at a user interface.

21 Claims, 4 Drawing Sheets

SYSTEM AND METHOD FOR COUPLING A COMPONENT TO A VEHICLE

BACKGROUND

The field of the disclosure relates generally to an alignment and loading system for coupling components to a vehicle, and more particularly, to a system and method that enables a single operator to align a component for attachment to a vehicle.

Various known vehicles, for example aircraft, may include a variety of externally attached payloads. More specifically, some known aircraft employ externally attached engines, munitions and/or armament systems such as, for example, missiles, rockets, and/or bombs, which are generally referred to as stores. In addition, other types of payloads, such as auxiliary fuel tanks and mounting racks, may be suspended from the underside of aircraft for use during flight operations.

Some known handling equipment for loading and unloading munitions, armaments, and other payloads, hereinafter referred to generally as "components", onto and off of aircraft pylons conventionally provide a trailer-type apparatus that is towed behind a truck or tractor. After the payload is placed on the trailer-type apparatus, the truck or tractor tows the apparatus to an aircraft where the apparatus is positioned beneath a location on the aircraft such that the component can be elevated into a loading position for attachment to the location on the aircraft by a fork-lift type mechanism on the trailer-type apparatus. During loading operations using such known lift vehicles, the lift operator's vision of the component's lugs and the aircraft's pylon hooks may be typically obscured, which requires additional ground crew personnel to be present to view the loading operations and direct the lift operator for proper positioning of the components prior to attachment with the vehicle.

It would be advantageous to provide a single operator positioning system for use on such lift vehicles that overcomes the lift operator's limited line-of-sight while providing direct alignment feedback to the lift operator during component attachment operations. Such a system would greatly reduce the costs associated with having multiple personnel assisting the loading of stores and/or payload while also reducing the risk of injury associated with performing such duties. It would also be advantageous to provide a component positioning system that would increase efficiencies and reduce the time and manpower typically required to load the stores/payload during time-critical loading operations, for example, in a war-type environment.

SUMMARY

In one aspect, an alignment system for coupling a component to a vehicle is provided. The alignment system includes at least one sensor target coupled to the component, and a controller assembly configured to transmit a signal towards the sensor target and receive a reflected signal from the sensor target, wherein the controller assembly is configured to output an orientation dataset for the component relative to the vehicle using the reflected signal. The system also includes a user interface communicatively coupled to the controller assembly, wherein the user interface translates the orientation dataset and displays a set of component positioning signals using the orientation dataset.

In another aspect, an alignment system for coupling a component to a vehicle is provided. The alignment system includes at least one sensor target coupled to the component, and a plurality of position detectors coupled to a plurality of attachment points on the vehicle. The system also includes a controller assembly communicatively coupled to the plurality of position detectors and configured to transmit a signal towards the sensor target and receive a positional dataset from the plurality of position detectors for the component relative to the plurality of attachment points. The controller assembly includes a processor programmed to compare the received positional dataset to a known set of alignment points, and determine a component repositioning sequence using the comparison.

In yet another aspect, a method for coupling a component to a vehicle is provided. The method includes transmitting a signal towards at least one sensor target coupled to the component, detecting a position of the sensor target relative to an attachment point of the vehicle, and receiving a positional dataset for the component relative to the plurality of attachment points. The method further includes comparing the received positional dataset to a known set of alignment points and determining a component repositioning sequence using the comparison.

DETAILED DESCRIPTION

Figure 1:
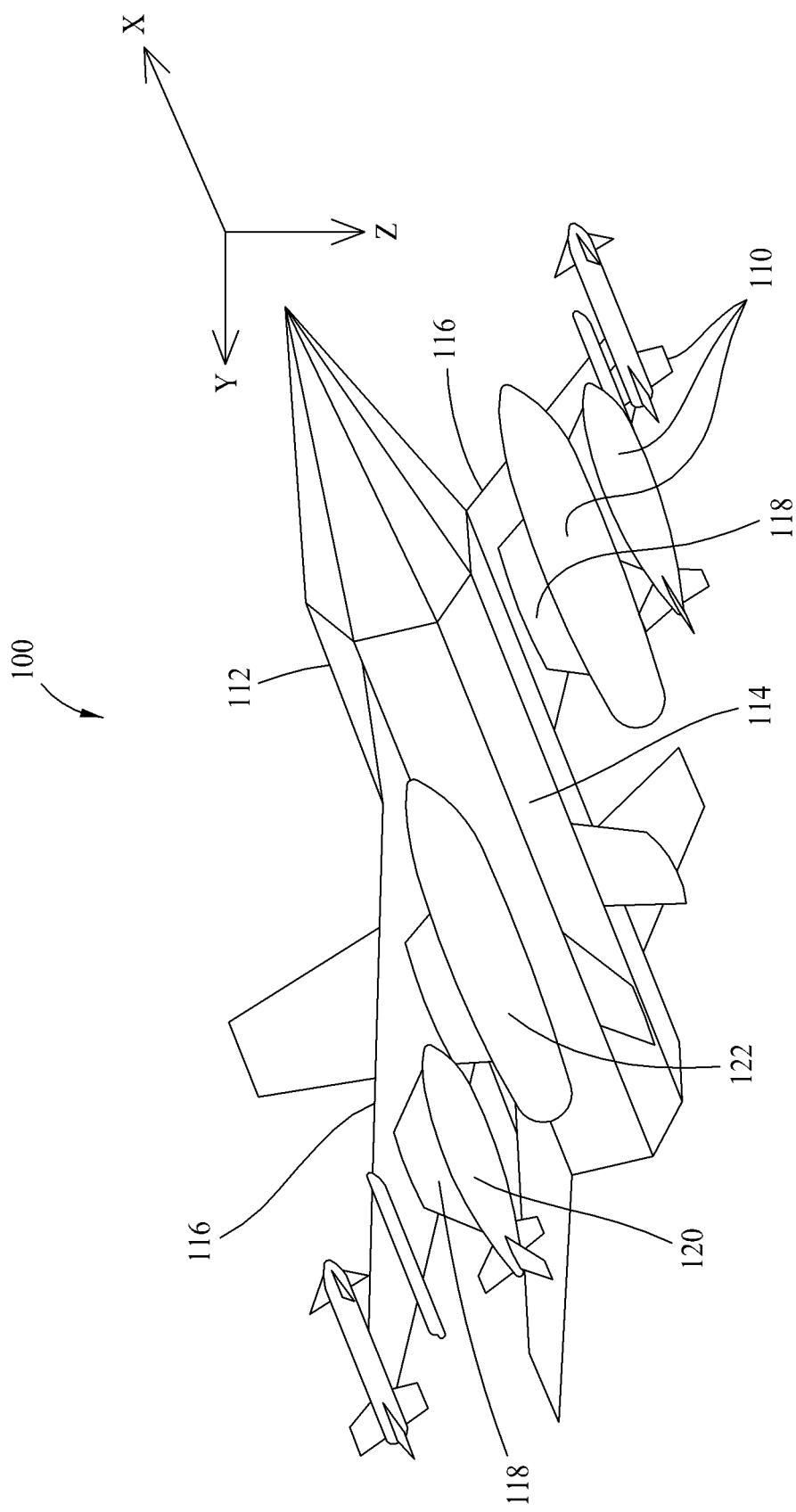
FIG. 1 is perspective view of an exemplary vehicle that includes at least one externally mounted component.

FIG. 1 is perspective view of an exemplary vehicle 100 that includes at least one component 110 mounted thereto. In one exemplary embodiment, vehicle 100 is an aircraft 112 having a fuselage 114 and a plurality of wings 116 extending therefrom. Aircraft 112 includes a plurality of pylons 118 mounted under each wing 116. In the exemplary embodiment, pylons 118 are used for coupling component 110 to aircraft 112. More specifically, pylons 118 are aerodynamically designed suspension devices installed under wing 116 and/or fuselage 114 from which a store 120, a payload 122 and/or an engine (not shown in FIG. 1) is attached. Store 120 may include any munitions and/or armament systems such as, for example, missiles, rockets, and/or bombs that are typically externally coupled to aircraft 112. In addition, externally mounted payload 122 may include auxiliary fuel tanks radar and/or other imaging systems and/or mounting racks that may be suspended from the underside of aircraft 112 for use during flight operations.

Figure 2:
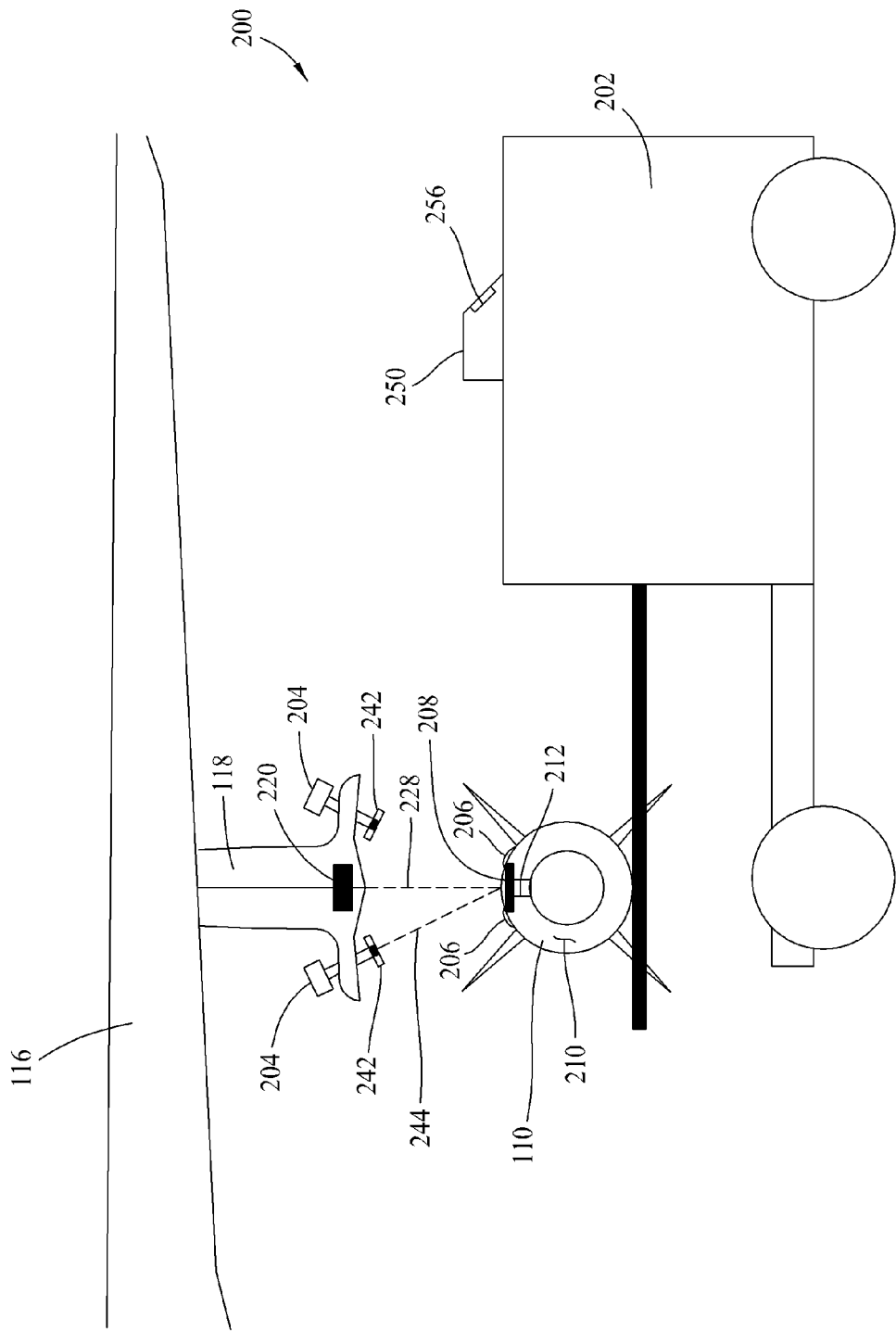
FIG. 2 is schematic illustration of an alignment system used for coupling the component to the vehicle, as shown in FIG. 1.
Figure 3:
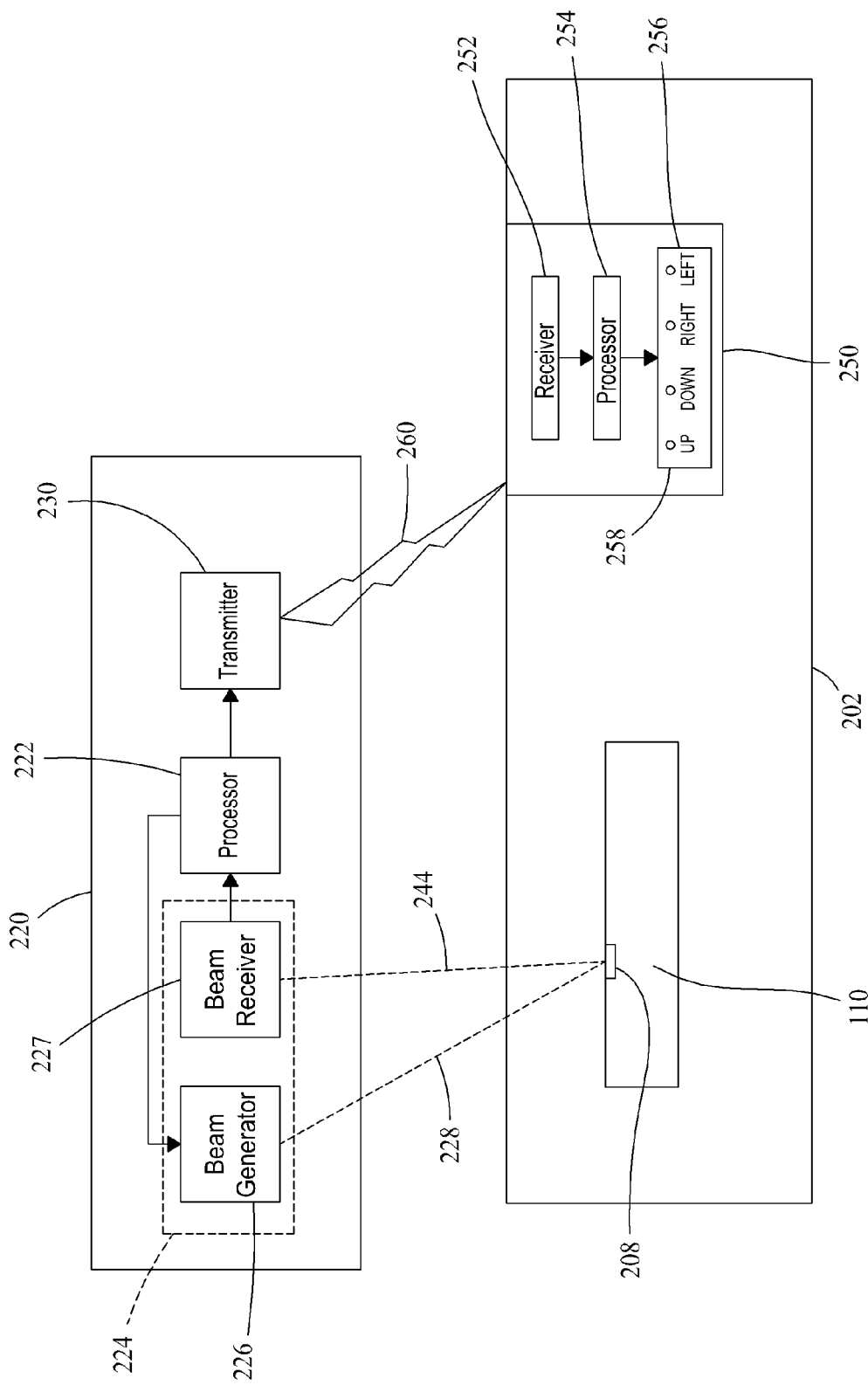
FIG. 3 is a block diagram of the alignment system shown in FIG. 2.

FIG. 2 is schematic illustration, and FIG. 3 is a block diagram of an exemplary alignment system 200 used for coupling component 110 to pylon 118, as shown in FIG. 1. During typical flight line operations, a lift truck 202 transports component 110 to aircraft 112 for coupling thereto. In the exemplary embodiment, pylon 118 extends downward from wing 116 and includes at least one payload retention assembly 204 that is sized and oriented to receive and maintain component 110 thereto until component 110 is manually or automatically released from pylon 118, for example, during flight. More specifically, component 110 includes at least one attachment device 206 that is received by payload retention assembly 204 to facilitate coupling component 110 to pylon 118. To facilitate proper positioning of component 110 relative to pylon 118, alignment system 200 includes at least one sensor target 208 coupled to component 110. In the exemplary embodiment, sensor target 208 is a reflector that is positioned in a predetermined location upon an outer surface 210 of component 110. Alternatively, sensor target 208 may include an RFID identifier 212 that is pre-scanned and used to identify the type of component 110 being coupled to aircraft 112, as described in more detail herein. Alternatively, such sensor target 208 and/or RFID tags 212 may be permanently attached to, or embedded within, component 110, for example, during manufacturing of component 110, or during a retrofit for field deployed components 110. Such sensor targets 208 and RFID tags 212, in the exemplary embodiment, are positioned at a predetermined location relative to attachment device 206 on outer surface 210 of component 110. RFID tag 212 may be pre-scanned during application to, or manufacturing of, component 110 to associate that particular tag with the type and/or classification of the component 110 to be installed on aircraft 112, and the specific location of the sensor target 208 relative to attachment device 206 for each component 110, as described in more detail herein. In an alternative embodiment, a bar code or other scannable identification tag may be permanently or temporarily positioned upon component 110 to enable identification of component 110, and to enable alignment system 200 to function as described herein.

To further facilitate proper loading and attachment of component 110 to pylon 118, alignment system 200 includes a controller assembly 220 positioned within pylon 118. More specifically, and in the exemplary embodiment, controller assembly 220 is powered by at least one of an on-board aircraft power generation assembly (not shown) and a self-contained battery (also not shown), and includes a processor 222 operatively coupled to an optical sensor assembly 224 having a light beam generator 226 and a light beam receiver 227. In the illustrated embodiment, light beam receiver transmits a beam 228 toward sensor target 208. Alternatively, processor 222 may be coupled to any type of proximity sensor assembly within controller assembly 220, including for example, an acoustic sensor assembly, a laser sensor, or an infrared sensor assembly. Controller assembly 220 includes a transmitter 230 used for transmitting a signal externally from controller assembly 220, as described in more detail herein. In an alternative embodiment, controller assembly 220 may be positioned adjacent to pylon 118 upon wing 116 or fuselage 114, or may be positioned on any external platform that enables alignment system 200 to function as described herein.

Optical sensor assembly 224 includes light beam receiver 227 which, in the exemplary embodiment is at least one position detector 242 (shown in FIG. 2) communicatively coupled to processor 222 and positioned on pylon 118 such that position detector 242 receives a beam 244 reflected from sensor target 208. Alternatively, position detector 242 may be positioned at any point on aircraft 112 that enables alignment system 200 to function as described herein. In the exemplary embodiment, position detector 242 is a quadrant photodetector. Alternatively, position detector 242 may be an array detector, or any type of position detection system used for calculating a position based on a fixed reference point.

Alignment system 200 includes a processing device 250 communicatively coupled to controller assembly 220. More specifically and in the exemplary embodiment, processing device 250 is mounted on lift truck 202, and includes a receiver 252, a processor 254 and a user interface 256 having a series of positioning lights 258. In the exemplary embodiment, processing device 250 receives a signal 260 wirelessly from controller assembly transmitter 230 and displays a set of instructions to facilitate properly positioning component 110 relative to aircraft 102, as described in more detail herein. Alternatively, processing device 250 may be temporarily hardwired to controller assembly 220, or may be communicatively coupled thereto in any manner that enables alignment system 200 to function as described herein. In another alternative embodiment, processing device 250 is not positioned on lift truck 202, but instead may be positioned at any location that will enable a single lift truck operator to view user interface 256 and maneuver component 110 into alignment to facilitate positioning of component 110 relative to pylon 118. In yet another embodiment, user interface 256 may be a video display screen that transmits an image of component 110 being aligned with pylons 118.

Figure 4:
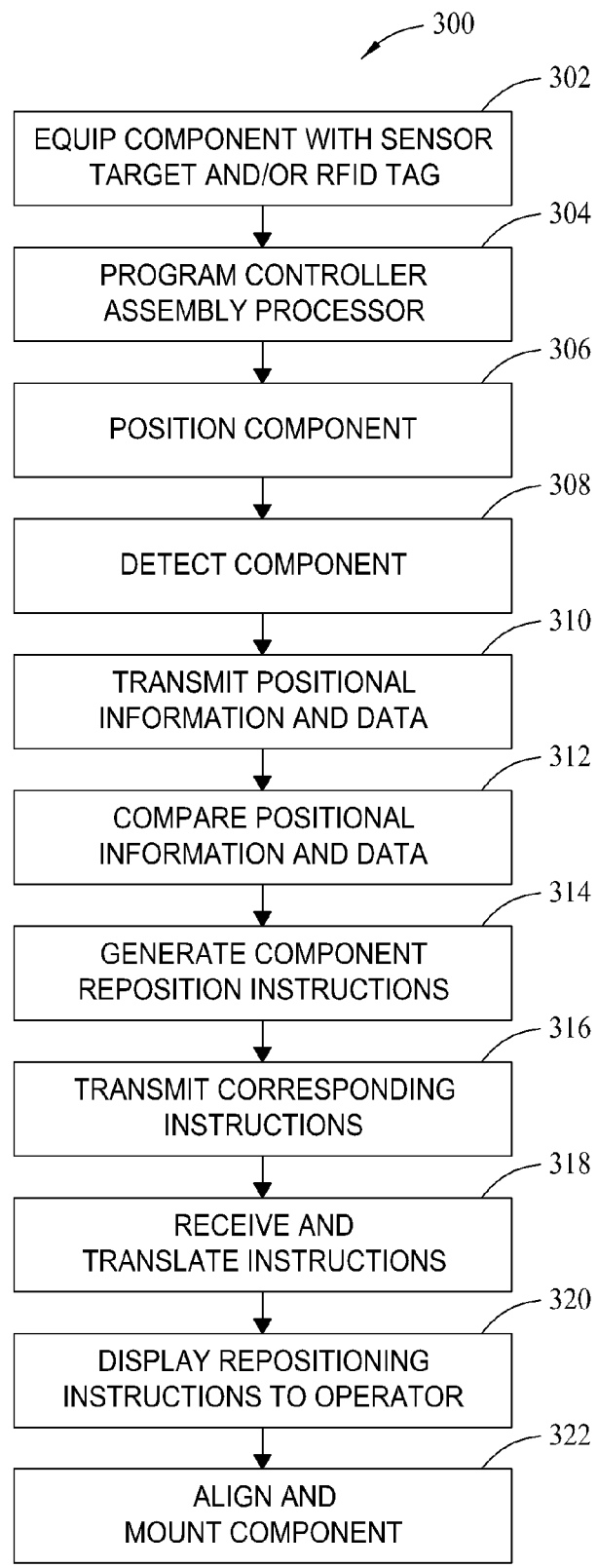
FIG. 4 is a flow diagram of an exemplary method of coupling the component to the vehicle.

FIG. 4 is a flow diagram of an exemplary method 300 of coupling component 110 to aircraft 112. Prior to commencement of alignment operations, in the exemplary embodiment, components 110 are equipped 302 with at least one temporarily applied sensor target 208 and at least one temporarily applied radio frequency identification (RFID) tag 212, as shown in FIG. 2. Additionally, also prior to operational use of alignment system 200 and in the exemplary embodiment, information regarding a location of position detectors 240 relative to payload retention assembly 204 on pylon 118 is programmed 304 in processor 222. In an additional embodiment, processor 222 may also be programmed with specific information about potential components 110 to be programmed 304 upon aircraft 112. More specifically, processor 222 may contain information regarding size of component 110 and/or location of sensor targets 208 relative to component positioning device, for example along an X-axis (aircraft roll), Y-axis (aircraft pitch), and/or Z-axis (aircraft yaw) coordinate system, as shown in FIG. 1.

During loading operations, lift truck 202 positions 306 component 110 in a vicinity of pylon 118 and sensor target 208 is oriented such that it will reflect a sensor beam 228 emitted by controller assembly 220, as shown in FIG. 2. More specifically, and in the exemplary embodiment, controller assembly 220 detects 308 component 110 by directing a sensor beam 228 towards component 110. Sensor beam 228 is reflected by sensor target 208 such that position detectors 240 receive the reflected beam 242. In the exemplary embodiment, position detectors 240 include a plurality of quadrant photodetectors that will detect the reflected beam 242 and transmit positional information 310 of the component 110 to processor 222 based upon the detected beam 308. Additionally, and in the exemplary embodiment, position detectors 240 are configured to detect 308 data from RFID tags 212 and transmit the data 310 to controller assembly, enabling the controller assembly to identify the component 110 being installed on the aircraft 112 and, in combination with the positional information from position detectors 240, enable aligning pylon payload retention assembly 204 with component attachment device 206, as described in more detail here.

In the exemplary embodiment, processor 222 receives the transmitted positional information 310 from position detectors 240 and compares 312 the information to the pre-programmed 302 position required for proper alignment of component 110 relative to payload retention assemblies 204. More specifically, processor 222 receives positional data of the component 110 along an X-, Y-, Z-axis coordinate system and compares 312 this data to the pre-installed positional information 302 for payload retention assemblies 204, and processor 222 then determines an error in the component position relative to the respective payload retention assembly 204.

Processor then generates 314 a series of component reposition instructions based on the determined errors. More specifically, and in the exemplary embodiment, processor 222 will compute an orientation dataset that includes a position movement, and a roll, a pitch and/or a yaw instruction, as needed, that will enable alignment of component 110 with pylon 118 and facilitate positioning component 110 such that component 110 may be coupled to pylon 118 as described herein. Controller assembly transmitter 230 then transmits 316 the generated 314 component reposition instructions to the user interface receiver 252. In the exemplary embodiment, the reposition instructions are transmitted 316 wirelessly to the processing device 250 that is positioned on lift truck 202. Alternatively, processing device 250 may be hardwired to controller assembly 220 and the component reposition instructions may be transmitted 316 in any manner that enables the alignment system 200 to function as described herein.

In the exemplary embodiment, processor 254 receives and translates 218 the repositioning instructions and displays 320 a set of component 110 positioning signals using the received instructions 218. More specifically, a series of lights 258 are illuminated on user interface 256 that correspond to the movements that a lift truck operator needs to execute to facilitate properly positioning and aligning component 110 with pylon 118. In the exemplary embodiment, component 110 is aligned in the X, Y and Z planes (roll, pitch and yaw, respectively, as shown in FIG. 1) and positioned relative to aircraft 112 such that component 110 is coupled to pylon in a time efficient manner while reducing man-power typically required for such loading operations. By following the displayed repositioning instructions 320, operator positions 322 component 110 relative to pylon 118 based on instructions received. This system enables a single lift truck operator to temporarily attach, in the case of missiles, rockets, and/or bombs for example, or permanently attach, in the case of engines and/or fuel tanks for example, component 110 without the need for additional personnel to align and guide component 110 into position.

Exemplary embodiments of alignment and loading systems for coupling stores and/or payload to an aircraft are described in detail above. The above-described alignment systems use a plurality of proximity-type sensors, processors and display units in combination to facilitate providing directional guidance to a single operator, resulting in a safer, more cost effective and accurate system. Such results are accomplished using an automated system to measure misalignments and errors in store/payload orientation and position, and output correction needed to properly position the component relative to the aircraft. More specifically, a lift operator's vision of the alignment of the component relative to the pylon hooks is typically obscured, requiring costly ground crew resources to view the alignment and direct the lift operator. The system disclosed herein facilitates solving the problem of the lift operator's limited view and greatly reduces the cost of having multiple personnel assisting the loading of missiles and also reduces the risk for injury of those personnel. Additionally, such a system will also increase efficiencies in loading the missile in a war type environment where these personnel resources may be needed elsewhere.

Although the foregoing description contains many specifics, these should not be construed as limiting the scope of the present disclosure, but merely as providing illustrations of some of the presently preferred embodiments. Similarly, other embodiments described herein may be devised which do not depart from the spirit or scope of the disclosure. Features from different embodiments may be employed in combination. The scope of the disclosure is, therefore, indicated and limited only by the appended claims and their legal equivalents, rather than by the foregoing description. All additions, deletions and modifications to the disclosure as disclosed herein which fall within the meaning and scope of the claims are to be embraced thereby.

Although the apparatus and methods described herein are described in the context of alignment and loading systems for use in positioning a store and/or a payload relative to an aircraft during attachment operations, it is understood that the apparatus and methods are not limited to aviation applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to describe the disclosure, including the best mode, and also to enable any person skilled in the art to practice the claimed embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An alignment system for coupling a component to a vehicle, the component including at least one component attachment device, said alignment system comprising:

at least one sensor target coupled to the component at a first predetermined distance from the at least one component attachment device;

a plurality of position detectors, each of said plurality of position detectors coupled to a predetermined location of a corresponding component retention assembly of a plurality of component retention assemblies on the vehicle, said plurality of position detectors configured to indicate a position of the at least one component attachment device relative to the at least one corresponding component retention assembly on the vehicle;

a controller assembly at a first location on the vehicle configured to transmit a signal from the first location towards said at least one sensor target at a second location and receive positional information of said at least one sensor target relative to the plurality of component retention assemblies based on the predetermined location of said plurality of position detectors coupled to said plurality of component retention assemblies on the vehicle at a third location; wherein the positional information is associated with a reflected signal received at said plurality of position detectors at the third location from said at least one sensor target at the second location, said controller assembly comprising a transmitter configured to transmit an orientation dataset indicative of a position of the component attachment device relative to the plurality of component retention assemblies on the vehicle based on a position of said at least one sensor target with respect to a position of said plurality of position detectors and a position of the at least one component attachment device; and a processing device communicatively coupled to said controller assembly, said processing device programmed to translate the orientation dataset transmitted by the transmitter and cause a set of component positioning signals based on the orientation dataset to be displayed at a user interface.

2. An alignment system in accordance with claim 1, wherein said orientation dataset comprises at least one of a roll, a pitch, a yaw of the component relative to the vehicle and a position of the component relative to the vehicle.

3. An alignment system in accordance with claim 1, further comprising an RFID tag coupled to the component, wherein said RFID tag identifies a classification for the component.

4. An alignment system in accordance with claim 3, wherein said controller assembly is configured to determine the classification of the component based on information provided by said RFID tag.

5. An alignment system in accordance with claim 1, wherein said controller assembly is positioned upon said vehicle.

6. An alignment system in accordance with claim 1, wherein said set of component positioning signals further comprises at least one of a visual representation of the component position relative to the vehicle and a set of instructions for coupling said component to said vehicle.

7. An alignment system in accordance with claim 1, wherein said controller assembly is configured to transmit data wirelessly to said user interface.

8. An alignment system in accordance with claim 1, wherein the signal is one of an optical signal, a radio frequency signal and an acoustic signal.

9. An alignment system for coupling a component to a vehicle, the component including at least one component attachment device, said alignment system comprising:

at least one sensor target coupled to the component at a first predetermined distance from the at least one component attachment device;

a plurality of position detectors, each of said plurality of position detectors coupled to a predetermined location of a corresponding component retention assembly of a plurality of component retention assemblies on the vehicle, said plurality of position detectors configured to indicate a position of the at least one component attachment device relative to the plurality of component retention assemblies on the vehicle;

a controller assembly at a first location on the vehicle configured to transmit a signal from the first location towards said at least one sensor target at a second location and receive positional information of said at least one sensor target relative to the plurality of component retention assemblies based on the predetermined location of said plurality of position detectors coupled to said plurality of component retention assemblies on the vehicle at a plurality of different locations remote from the first and second locations, wherein the positional information is associated with a reflected signal received at said plurality of position detectors at the plurality of different locations sent from said at least one sensor target at the second location, said controller assembly comprising a processor programmed to:

compare the received positional information to a known set of alignment points;

determine a component repositioning sequence using the comparison; and transmit, using a transmitter, an orientation dataset to a processing device communicatively coupled to said processor.

10. An alignment system in accordance with claim 9, wherein said processor is further programmed to output the orientation dataset indicating a position movement that will enable alignment of said at least one sensor target associated with the component with the plurality of corresponding attachment points.

11. An alignment system in accordance with claim 10, wherein said processing device programmed to translate the orientation dataset and cause a set of component positioning signals based on the orientation dataset to be displayed at a user interface.

12. An alignment system in accordance with claim 11, wherein said user interface is at least one of a plurality of positioning lights and a video display unit.

13. An alignment system in accordance with claim 10, wherein said orientation dataset comprises at least one of a roll, a pitch, a yaw of the component relative to the vehicle, and a position of the component relative to the vehicle.

14. An alignment system in accordance with claim 10, further comprising an RFID tag coupled to the component, wherein said RFID tag identifies a classification for the component.

15. An alignment system in accordance with claim 14, wherein said controller assembly is configured to determine the classification of component based on information provided in said RFID tag.

16. An alignment system in accordance with claim 10, wherein said controller assembly is positioned upon said vehicle.

17. An alignment system in accordance with claim 11, wherein said set of component positioning signals further comprises at least one of a visual representation of the component position relative to the vehicle and a set of instructions for coupling said component to said vehicle.

18. An alignment system in accordance with claim 11, wherein said controller assembly is configured to transmit data wirelessly to said user interface.

19. An alignment system in accordance with claim 9, wherein the signal is one of a light signal, a radio frequency signal and an acoustic signal.

20. A method for coupling a component to a vehicle, the component including at least one component attachment device, said method comprising:

transmitting a signal from a first location towards at least one sensor target at a second location, the at least one sensor target coupled to the component at a first predetermined distance from the at least one component attachment device;

detecting, by a plurality of position detectors, a reflected signal sent from the at least one sensor target at the second location, each of the plurality of position detectors coupled to a predetermined location of a corresponding component retention assembly of a plurality of component retention assemblies on the vehicle at a third location, the reflected signal indicative of a position of the at least one sensor target relative to the plurality of component retention assemblies based on a position of the at least one sensor target relative to a position of the plurality of position detectors and a position of the at least one component attachment device;

receiving a positional dataset from the plurality of position detectors for the component relative to the plurality of component retention assemblies;

comparing the received positional dataset to a known set of alignment points;
determining a component repositioning sequence using the comparison; and
transmitting, using a transmitter, an orientation dataset to a processing device.

21. A method in accordance with claim 20, further comprising:
outputting the orientation dataset indicating a position movement that will enable alignment of the component with the plurality of component retention assemblies;
translating the orientation dataset into a user-readable output; and
positioning the component in accordance with the user-readable output.

* * * * *